United States Patent

Mateja

[15] 3,697,158

[45] Oct. 10, 1972

[54] SOUND-ON-FILM RECORDING SYSTEM

[72] Inventor: Eugene V. Mateja, Norridge, Ill.

[73] Assignee: Bell & Howell Company, Chicago, Ill.

[22] Filed: Sept. 28, 1970

[21] Appl. No.: 76,147

[52] U.S. Cl. .......................... 352/17, 352/22, 352/27
[51] Int. Cl. .......................... G03b 31/02
[58] Field of Search .......... 352/12, 13, 14, 15, 16, 17, 352/18, 19, 20, 22, 23, 26, 27

[56] References Cited

UNITED STATES PATENTS

| | | | |
|---|---|---|---|
| 3,620,609 | 11/1971 | John | 352/22 X |
| 3,583,796 | 6/1971 | Colodner | 352/19 |
| 3,588,558 | 6/1971 | Levin | 352/17 X |
| 3,539,248 | 11/1970 | Lancor, Jr. | 351/19 X |

*Primary Examiner*—Samuel S. Matthews
*Assistant Examiner*—Michael L. Gellner
*Attorney*—William F. Pinsak, John E. Peele, Jr., William K. Serp and Kenneth W. Greb

[57] ABSTRACT

An apparatus for recording on developed motion picture film an audio signal previously recorded on a separate magnetic tape during initial exposure of the film in a camera which also carries a pulsed synchronizing signal. A projector generates a pulsed signal related to the rate of film movement therethrough which is compared with the pulsed synchronization signal upon the magnetic tape. A phase comparator compares the signal from the projector with that played back from the tape and develops a control signal. The control signal is fed to a period to voltage converter which in turn controls the speed of the recorder to maintain synchronization.

13 Claims, 6 Drawing Figures

Inventor:
Eugene V. Mateja

PATENTED OCT 10 1972 3,697,158

Inventor:
Eugene V. Mateja.

Inventor:
Eugene U. Mateja

SOUND-ON-FILM RECORDING SYSTEM

This invention relates to a sound-on-film recording system and more particularly to a system for recording on developed motion picture film an audio signal previously recorded on a separate magnetic tape during initial exposure of the film. The system of this invention is highly stable and reliable in operation and accurate synchronized recording of the audio signal is readily achieved with minimum wow and flutter.

Systems have heretofore been developed for recording an audio signal with a magnetic tape unit while operating a motion picture camera. In such systems, start or "glitch" marks have been recorded on the film and synchronizing signals have been recorded on a control track of the tape, for starting a separate tape unit and synchronizing the operation of the tape unit and a projector after developing the film. Such systems have been highly satisfactory, especially in that they avoid serious problems involved in attempting to record sound-on-film while simultaneously exposing the film in a camera. However, such systems have had a minor disadvantage in that the film and sound media are separated and the equipment associated with the tape and film must be set up separately although continuously synchronized. In terms of user convenience, a sound-on-film system is easier since only a single medium is handled. This is particularly true for projection/playback since a film may be projected many times, although being handled and exposed only once during taping and recording.

This invention was evolved with the general object of overcoming disadvantages of prior systems.

According to this invention, an audio signal is recorded with a magnetic tape unit while operating a motion picture camera, in the same way as in the above-described systems. However, after the recording on tape and exposure and developing of the film, the audio signal from the tape is recorded or "dubbed" on a magnetic stripe on the film, in synchronism. The film may then be run through a projector having means for reproducing the signal recorded on the stripe. Thus, the advantages of the recording of the audio signal on a separate tape are retained, while eliminating the disadvantages of reproduction of the audio signal from a separate tape.

According to a very important feature, the film is driven at a substantially constant speed and synchronizing means are provided for controllably energizing electric drive means for the tape, to drive the tape in synchronism with the drive of the film. With this arrangement, a high degree of accuracy is obtained. Among other things, the inertial damping required for the tape drive is much less than that required for the film drive. Thus the film may be driven conventionally and synchronism is obtained by accurately controlling the drive speed of the tape in relation to that of the film.

According to a specific feature, the synchronizing means includes a phase comparator which compares two periodic signals to develop a control signal for use in controlling the tape drive. One signal is reproduced from a control track of the magnetic tape, the signal having been recorded during initial recording of the audio signal and initial exposure of the film in the camera. The second signal is generated from the film drive mechanism.

Another specific feature relates to the circuitry of a period-to-voltage converter used in conjunction with the phase comparator.

A further specific feature relates to electronic governor circuitry for energizing the tape drive motor.

Another important feature relates to a frequency multiplying circuit for multiplying the rate of the periodic signal reproduced from the tape, the periodic signal from the film drive being either generated at a multiplied rate or being multiplied by the same factor. With higher frequency signals, more accurate control is obtained and wow and flutter are further minimized.

Additional features relate to the control of the starting of the tape unit. During the initial audio recording and film exposure, a transparent start or "glitch" mark may be recorded on the film, preceding each audio signal recording sequence and in previous systems, means are provided for sensing the transparent glitch mark to initiate operation of the tape drive means. When a magnetic stripe is applied to the film, however, the glitch mark is rendered opaque and in the system of this invention, means are provided for sensing an opaque glitch mark. This invention contemplates other objects, features and advantages which will become more fully apparent from the following detailed description taken in conjunction with the accompanying drawings which illustrate the preferred embodiments and in which:

Figure 1:
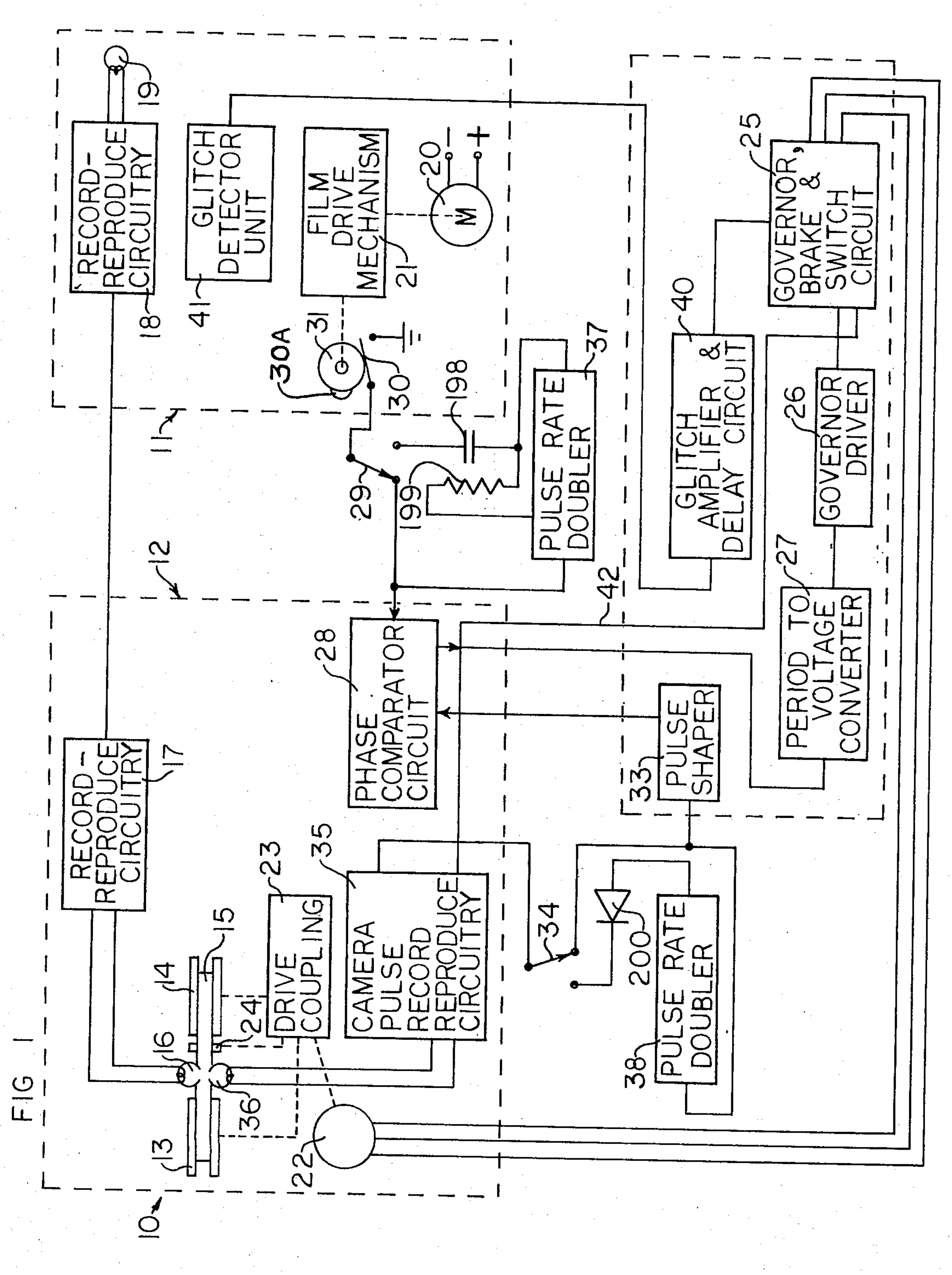
FIG. 1 is a schematic block diagram of a sound-on-film system constructed in accordance with the principles of this invention.

Reference numeral 10 generally designates a sound-on-film system constructed in accordance with the principles of this invention. The system 10 is especially designed for recording on developed film an audio signal previously recorded on magnetic tape during initial exposure of the film in a motion picture camera. In general, the system 10 comprises a projector 11 in which the developed film is driven between supply and take-up reels, not shown, and a magnetic tape unit 12 including a supply reel 13 and a take-up reel 14 between which a suitable magnetic tape 15 is moved. Audio signals are reproduced from a track of the tape 15 by a record-reproduce head 16 and are applied to record-reproduce circuitry 17 in the tape unit 12 which, in turn, applies the reproduced signals through record-reproduce circuitry 18 in the projector 11 to a record-reproduce head 19 which records the audio signal on a magnetic stripe on the film.

The invention is particularly concerned with the synchronization of the drive of the film and the tape and it is important to an understanding of the invention to first consider the manner in which the recording of the audio signal is accomplished initially.

During operation of the camera in the taking of the motion pictures and in the initial sound recording, synchronizing pulses are supplied from the camera to be recorded on a control track of the tape 15, at the same time that the audio signal is recorded on an audio track. In response to the first few synchronizing pulses, the drive of the tape is started while at the same time a lamp is energized to record a start mark on the film, referred to as a "glitch" mark. When the synchronizing pulses stop, at the end of an audio signal recording sequence, a burst of relatively high frequency pulses may be recorded on the control track and the drive of the tape is then stopped.

After developing of the film, it may be run through a projector while the sound is reproduced by a separate tape unit. In such an operation, the start mark on the film is sensed by a photocell and the drive of the tape is then started. Reproduced synchronizing signals are compared with feedback signals from the projector to develop a control signal used to control the speed of drive of the projector. When the reproduced high frequency stop pulses are detected, the drive of the tape is stopped and thereafter in response to the next start mark, the start and stop sequence is repeated.

The recording of the audio signal by means of a separate tape unit has important advantages, particularly in that high quality recording is possible with equipment which is relatively inexpensive. However, the use of a separate tape unit during projection in playback is not as convenient as would be desirable, since separate equipment must be set up for each projection in playback operation, which may be repeated many times.

With the system of this invention, the initial recording is accomplished with a separate tape unit, retaining the advantages thereof. However, the audio signal is recorded on the magnetic stripe of the developed film, so that the film may be run through a projector having audio signal reproducing means, eliminating the inconvenience of using separate units in each projection and playback operation.

In the system 10 of this invention, an electric motor 20 is coupled to a film drive mechanism 21 to drive the film at a substantially constant speed and synchronizing means are provided for controlling the energization of a motor 22 which is coupled through a drive coupling 23 to the supply and take-up reels 13 and 14 as well as to a capstan 24, as diagrammatically illustrated. The synchronizing means operate to accurately synchronize the drive of the tape 15 with that of the film.

The motor 22 is connected to a governor, brake and switch circuit 25 which is coupled through a governor driver 26 to the output of a period to voltage converter 27 having an input connected to the output of a phase comparator circuit 28. Circuit 28 has two inputs. The first is connected through a selector switch 29 and a reed switch 30 to ground. Reed switch 30 is operated by a magnet 30A carried by a disc 31 driven from the film drive mechanism 21 to be operated periodically at a rate proportional to the speed of movement of the film. The second input of the phase comparator circuit 28 is connected to the output of a pulse shaper 33 having an input connected through a selector switch 34 to an output of camera pulse record reproduce circuitry 35, connected to a magnetic head 36 for the control track of the tape 15.

Phase comparator 28 thus operates to compare the phase of a first periodic signal, having a rate proportional to the speed of the film, and the phase of a second periodic signal, reproduced from the signal recorded on the control track during initial recording of the audio signal. The output of the phase comparator circuit 28 is applied through the period to voltage converter 27 and the governor driver 26 to the governor, brake and switch circuit 25 to control the motor 22 and to obtain synchronized drive of the tape 15.

In accordance with a specific feature of the invention, the frequency or rate of the signals produced by the reed switch 330 may be multiplied by means of a pulse rate doubler circuit 37, by operation of selector switch 29 to a position opposite that illustrated. Similarly, the frequency or rate of the pulses derived from the control track of the tape 15 may be multiplied by means of another pulse rate doubler circuit 38, by moving selector switch 34 to a position opposite that illustrated. As described hereinafter, circuits 37 and 38 may be used to obtain more accurate and responsive control and synchronization.

The governor, brake and switch circuit 25 is also connected to the output of a glitch amplifier and delay circuit 40 having an input connected to a glitch detector unit 41 in the projector 11.

After threading film in the projector 11, the motor 20 may be energized to drive the film and when a start of "glitch" mark on the film passes a certain point, the detector unit 41 applies a signal to the circuit 40 which after a certain delay applies an amplified signal to the governor, brake and switch circuit 25 to initiate energization of the motor 22 and to drive the tape 15. As previously described, high frequency stop signals may be recorded on the control track of the tape 15 at the end of an audio signal sequence. Such signals may be detected by circuitry in the unit 35 to develop a signal which is applied through a line 42 to the governor, brake and switch circuit 25 to stop the drive of the motor 22.

When another start or glitch mark is detected, the drive of the tape 15 by the motor 22 may be re-initiated as above described. Thus, one length of film may have a plurality of sections as to which a corresponding audio signal has been recorded, but such sections may be separated by others as to which no corresponding audio signal has been recorded. The length of the tape 15 thus does not necessarily correspond to the length of the film, and the tape may be repeatedly started and stopped during running of the film.

Figure 2:
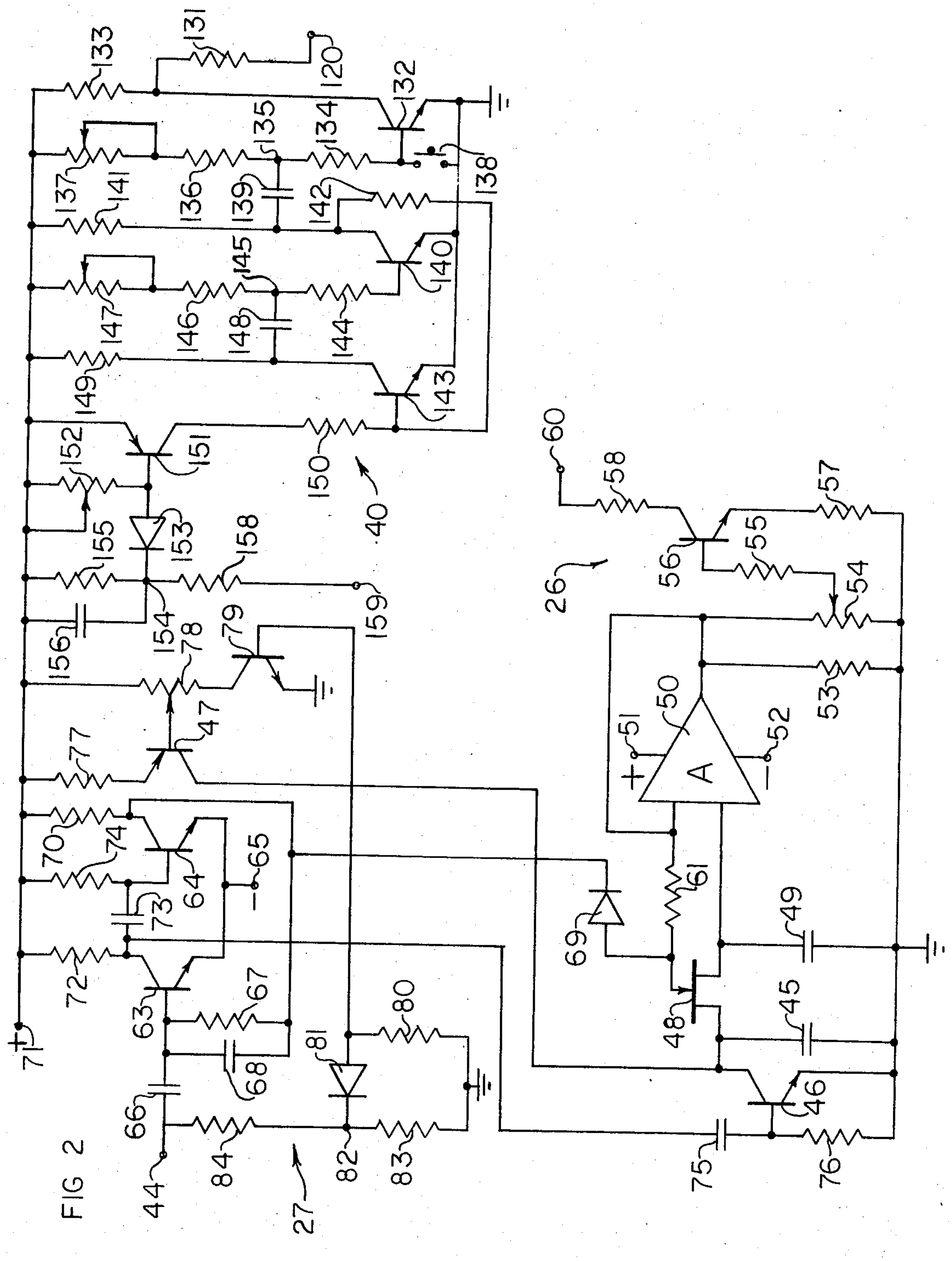
FIG. 2 is a circuit diagram of a period to voltage convertor and a glitch amplifier and delay portion of the system.

The phase comparator circuit 28 may preferably include a bistable circuit switched to one condition in response to each signal from the reed switch 30, operated by the film drive mechanism 21, and switched to the opposite condition in response to each reproduced signal from the control track of the tape 15. The circuit 28 thus generates a square wave signal the relative durations of the positive and negative portions of which correspond to the phase relation of the two input signals. This square wave signal is applied to an input terminal 44 of the period to voltage converter circuit 27, the details of which are shown in FIG. 2. Circuit 27 includes a first capacitor 45 which at the beginning of a negative portion of the square wave signal is discharged by means of a transistor 46, after which it is charged at a linear rate through current flow through a transistor 47. At the end of the negative portion of the input square wave, the voltage to which the capacitor 45 is charged is proportional to the duration of the negative portion. At this time, a switching transistor 48 is rendered conductive to connect the capacitor 45 in parallel with a capacitor 49 and to charge the capacitor 49 to a voltage proportional to and nearly equal to the voltage to which the capacitor 45 was charged at the end of the negative portion of the square wave. Capacitor 49 preferably has a value which is a small fraction of that of the capacitor 45. By way of example, the capacitor 49 may have a value of 0.01 microfarads while the capacitor 45 may have a value of 0.1 microfarads.

The capacitor 49 remains charged until the transistor 48 is again rendered conductive at the end of the next negative portion of the input square wave, at which time, the capacitor 49 may be charged to a higher or lower value, or may remain at the same charge, depending upon the duration of the next negative portion of the squarewave. The voltage developed across the capacitor 49 is applied to an input terminal of an integrated circuit amplifier 50 having terminals connected to positive and negative power supply terminals 51 and 52. An output terminal of the amplifier 50 is connected through a resistor 53 and a potentiometer 54 and parallel to ground, the movable contact of potentiometer 54 being connected through a resistor 55 to the base of a transistor 56 having its emitter connected through a resistor 57 to ground. The collector of the transistor 56 is connected through a resistor 58 to a line 60 which forms the input to the governor, brake and switch circuit 25. Transistor 56 and associated circuitry form the governor driver 26.

The output of the amplifier 50 is also connected to another terminal thereof and through a resistor 61 to the control electrode of the switching transistor device 48.

To control conduction of the transistors 46 and 48 in response to the input square wave signal, a control circuit is provided which includes a pair of transistors 63 and 64 having emitters connected together and to a power supply terminal 65 which may, for example, be at −12 volts relative to ground. The base of the transistor 63 is connected through a coupling capacitor 66 to the input terminal 44 and is also connected through the parallel combination of a resistor 67 and a capacitor 68 to the collector of the transistor 64 which is connected through a diode 69 to the control electrode of the transistor switching device 48 and through a resistor 70 to a power supply terminal 71 which may, for example, be at +12 volts relative to ground. The collector of the transistor 63 is connected through a resistor 72 to the terminal 71 and is also connected through a capacitor 73 to the base of the transistor 64 which is connected through a resistor 74 to the terminal 71. The collector of the transistor 63 is connected also through a coupling capacitor 75 to the base of the transistor 46 which is connected through a resistor 76 to ground.

The transistor 47 which controls the charging rate of the capacitor 45 has its collector connected to the capacitor 45 with the emitter thereof being connected through a resistor 77 to the terminal 71. The base of transistor 47 is connected to the movable contact of a potentiometer 78 connected between terminal 71 and the collector of a transistor 79 the emitter of which is grounded. The base of the transistor 79 is connected through a resistor 80 to ground and through a diode 81 to a circuit point 82 which is connected through a resistor 83 to ground and through a resistor 84 to the input terminal 44.

In operation, the transistor 63 is cut off at the beginning of the negative portion of a square wave signal to apply a short positive pulse to the base of the transistor 46 and to discharge the capacitor 45 which is then charged at a linear rate controlled by the adjustment of the potentiometer 78. At the end of the negative portion of the square wave, a short pulse is applied from the collector of the transistor 64 through the diode 69 to the control electrode of the device 48 to render the device 48 conductive and to charge the capacitor 49 to a voltage proportional to the voltage of the capacitor 45.

Figures 3, 4:
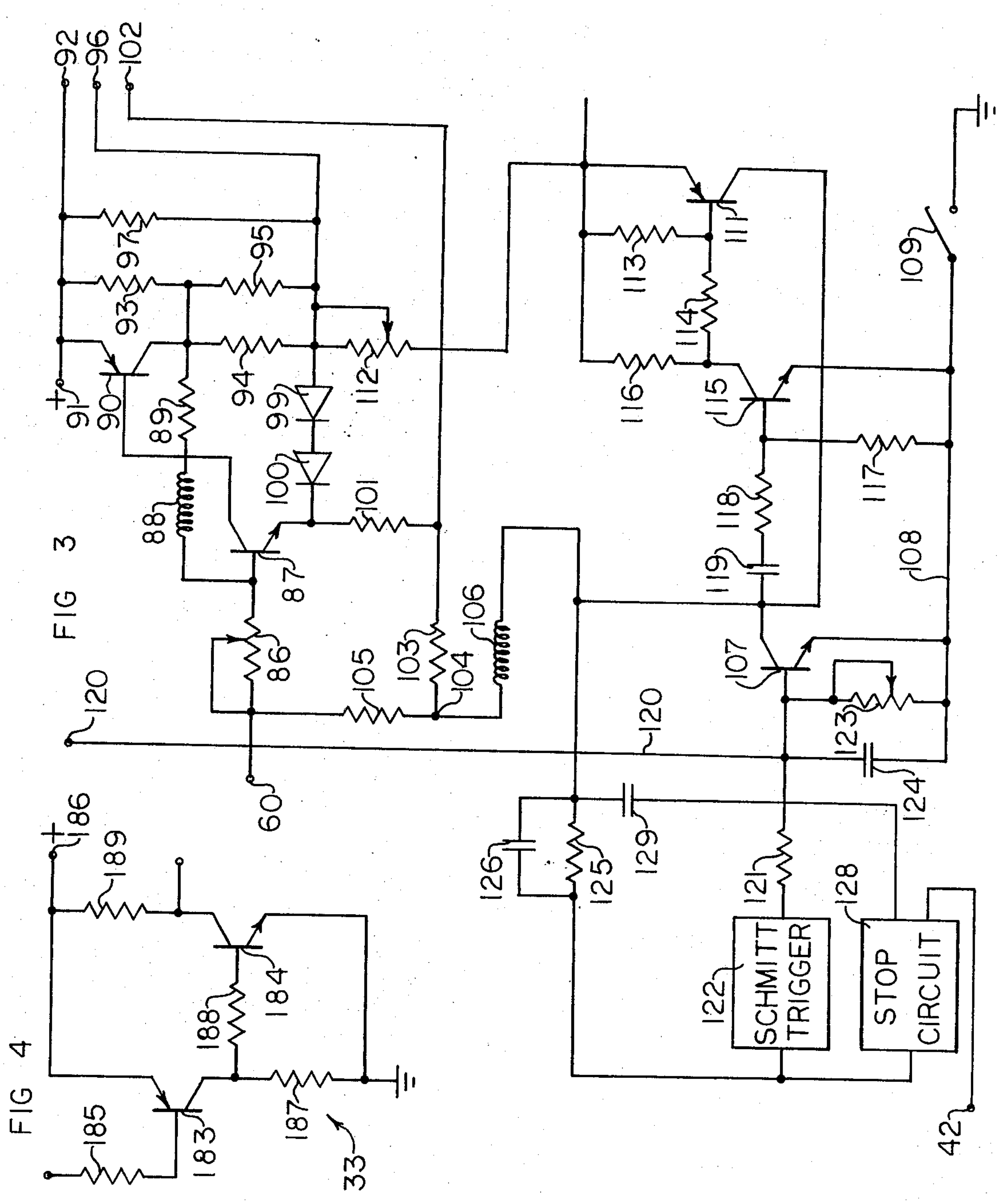
FIG. 3 illustrates governor drive, brake and switch circuitry.
FIG. 4 illustrates a shaping amplifier circuit.

Referring to FIG. 3, the output of the governor driver 26 is applied through line 60 and through an adjustable resistor 86 to the base of a transistor 87 and also through an inductor 88 and a resistor 89 to the collector of a transistor 90 the base of which is connected directly to the collector of the transistor 87. The emitter of the transistor 90 is connected to a power supply terminal 91 which may be connected to the positive terminal of a 7.5 volt supply terminal 91 being also connected to a line 92, connected to one terminal of the motor 22. A resistor 93 is connected between the emitter and collector of the transistor 90 and resistors 94 and 95 are connected between the collector of transistor 90 and a line 96 which is connected to another terminal of the motor 22. Another resistor 97 may be connected between lines 92 and 96. Line 96 is connected through diodes 99 and 100 to the emitter of the transistor 87 which is connected through a resistor 101 to a line 102 connected to a third terminal of the motor 22. Line 102 is connected through a resistor 103 to a circuit point 104 which is connected through a resistor 105 to the line 60 and which is connected through an inductor 106 to the collector of a transistor 107 the emitter of which is connected to a line 108 connected to ground and to the negative terminal of the power supply connected to terminal 91, when a switch 109 is closed.

In operation of the circuitry of FIG. 3, as thus far described, the transistor 107 is rendered conductive to energize the motor 22. The transistors 87 and 90 then respond to the signal at the input line 60 to control the current of the motor and to control the speed of operation thereof. As an example, it may be assumed that the signal from the phase comparator circuit 28 is such as to indicate a need to reduce the speed of drive of the tape 15. A signal change in such a directional allows more time for the capacitor 45 to charge and it is thereby charged to a higher voltage. The higher voltage is transferred to the sampling capacitor 49 and eventually to the base of the transistor 56. With increased conduction through the transistor 56, base current is shunted from the transistor 87, reducing conduction of transistor 90 and thereby increasing the effective series impedance seen by the drive motor 22, so as to reduce the speed of drive of the tape, which is the desired effect.

When the transistor 107 is rendered non-conductive, a transistor 111 is rendered conductive to produce a braking of action on the motor 22, the emitter of the transistor 111 being connected through an adjustable resistor 112 to the line 96 and the collector thereof being connected through the inductor 106 and resistor 103 to the line 102. To render the transistor 111 conductive, the base thereof is connected through a resistor 113 to the emitter thereof and through a resistor 114 to the collector of a transistor 115, also connected through a resistor 116 to the emitter of the transistor 111. The emitter of the transistor 115 is connected to the line 108 and the base thereof is connected through a resistor 117 to the line 108 and also through a resistor 118 and a capacitor 119 in series to the collector of the transistor 107. When the transistor 107 is rendered non-conductive, a positive signal is applied to the base of the transistor 115 to lower the potential of the collector thereof and to cause conduction of the transistor 111 which operates as a partial shunt on the motor 22, to obtain the braking action.

To render the transistor 107 conductive, a positive signal is applied to the base thereof from the glitch amplifier and delay circuit 40 through a line 120. The base of transistor 107 is also connected through a resistor 121 to the output of a Schmitt trigger circuit 122 and the base of transistor 107 is also connected through an adjustable resistor 123 and a parallel capacitor 124 to the line 108. The input of the Schmitt trigger circuit 122 is connected through a resistor 125 and a parallel capacitor 126 to the collector of the transistor 107, a feedback circuit being thereby provided which functions to trigger the circuit 122 to a condition such as to maintain conduction of the transistor 107, when the transistor 107 is rendered conductive by a start signal on line 120.

To render the transistor 107 non-conductive, a signal is applied to the input of the Schmitt trigger circuit 122 from the output of a stop circuit 128 which is connected through the line 42 to the camera pulse record-reproduce circuitry 35. When high frequency pulses are reproduced from the control track of the tape 15, at the end of an audio signal sequence, the stop circuit 128 functions to trigger the Schmitt trigger circuit 122 to a condition such as to remove the positive signal from the base of the transistor 107 and thus render the transistor 107 non-conductive. A capacitor 129 is connected between the collector of the transistor 107 and the stop circuit 128 to prevent operation of the stop circuit 128 for a certain time interval after the transistor 107 is rendered conductive by a start signal applied on line 120.

The signal applied on line 120 is developed from the glitch amplifier and delay circuit 40 which is shown in FIG. 2. The line 120 is connected through a resistor 131 to the collector of a transistor 132 which is connected through a resistor 133 to the power supply terminal 71, the emitter of the transistor 132 being connected to ground. Transistor 132 is normally conductive but is rendered non-conductive to develop a positive signal at the collector thereof and to initiate conduction of the transistor 107 in the circuit of FIG. 3. In particular, the base of the transistor 132 is connected through a resistor 134 to a circuit point 135 which is connected through a resistor 136 and an adjustable resistor 137 to the power supply terminal 71, thus applying a positive bias to the transistor 132. To cut off conduction of the transistor 132 a negative-going signal may be applied to the circuit point 135 from a delay circuit or a push button switch 138 may be manually closed to ground the base of the transistor 132.

With regard to the delay circuit, the circuit point 135 is connected through a coupling capacitor 139 to the collector of a transistor 140 which is connected through a resistor 141 to the terminal 71 and through a resistor 142 to the base of a transistor 143. The emitters of the transistors 140 and 143 are connected to ground. The base of the transistor 140 is connected through a resistor 144 to a circuit point 145 which is connected through a resistor 146 and an adjustable resistor 147 to the terminal 71. Circuit point 145 is connected through a capacitor 148 to the collector of the transistor 143 which is connected through a resistor 149 to the terminal 71. The base of the transistor 143 is connected through a resistor 150 to the collector of a transistor 151 the emitter of which is connected to terminal 71. The base of the transistor 151 is connected through an adjustable resistor 152 to the terminal 71 and through a diode 153 to a circuit point 154 which is connected through a resistor 155 and a parallel capacitor 156 to the terminal 71. Circuit point 154 is also connected through a resistor 158 to a line 159 which is connected to the output of the glitch detector unit 41.

In operation, transistors 132 and 140 are normally conductive while transistors 143 and 151 are normally non-conductive. When the negative-going input signal is applied on line 159, the transistor 151 is rendered conductive to render the transistor 143 conductive and to cut off the transistor 140, conduction of the transistor 143 being maintained through the feedback through resistor 142. At this point, the transistor 132 remains conductive. After a certain time delay, determined by the value of the capacitor 148 and the values of the resistors in circuit therewith, including the adjustable resistor 147, the transistor 140 is again rendered conductive and through the coupling capacitor 139 a negative-going signal is applied to the base of the transistor 132 to cut off the transistor 132 and to develop a positive signal at the collector thereof which is applied through the resistor 131 and the line 120 to the base of the transistor 107, shown in FIG. 3. Thus, in response to an input signal on line 159, a positive signal is developed on the output line 120 after a certain time delay, which may be adjusted by adjustment of the resistor 147.

Figure 5:
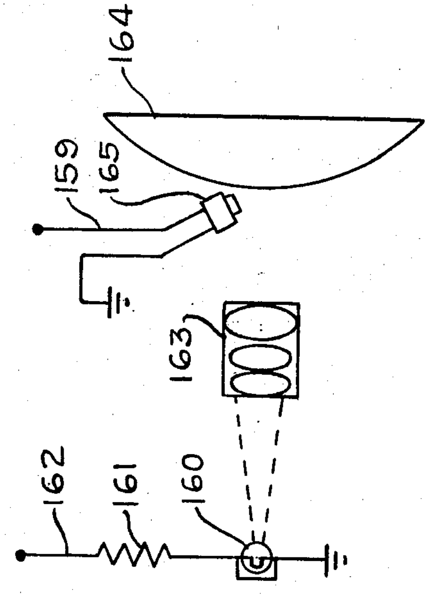
FIG. 5 illustrates a glitch detector arrangement and associated circuitry.

FIG. 5 shows a start mark or "glitch" detector arrangement and circuit. During operation of the camera, a lamp is energized to produce a mark which is transparent after the film is developed and in other types of systems, means are provided for sensing a transparent mark. However, in the system of this invention, the magnetic stripe covers the mark and the arrangement shown in FIG. 5 is designed to detect an opaque mark.

In particular, a lamp 160 which is connected in series with a resistor 161 between ground and a power supply terminal 162, is arranged to project light through a lens unit 163 against a point of the film which is entrained about a suitable guide 164 and a photocell 165 is arranged to sense the reflected light. Photocell 165 is connected between ground and line 159. In operation, the photocell 165 is normally highly resistive. When the reflected light is increased, the conduction through the photocell 165 is increased biasing transistor 151 into conduction. Thus a negative going pulse is developed on the line 159 which is applied to the delay and amplifier circuit 40 shown in FIG. 2.

Referring to FIG. 4, the pulse shaper 33 comprises a pair of transistors 183 and 184. An input signal from the circuitry 35, or from the output of the pulse rate doubler circuit 38, is applied through a resistor 185 to the base of the transistor 183, the emitter of which is connected to a power supply terminal 186. The collector of the transistor 183 is connected through a resistor 187 to ground and through a resistor 188 to the base of the transistor 184. The emitter of the transistor 184 is connected to ground while the collector thereof is connected through a resistor 189 to the terminal 186 and to an output line connected to the phase comparator circuit 28. This circuit functions to shape the reproduced pulses from the tape 15 and to insure that each pulse is of adequate amplitude.

The operation of the system as thus far described is quite satisfactory but in some conditions of operation, a noticeable flutter component may be introduced, possibly due to the change in charge of the capacitor 49 during each cycle. Normally, the control signal is reproduced from the tape and the signals from the reed switch 30 may be at a frequency of approximately 18 Hz and, when produced, the flutter component is at that frequency. To obviate the production of the flutter component, the pulse rate doubler circuits 37 and 38 may be included in the circuit, by operation of the switches 29 and 34.

Figure 6:
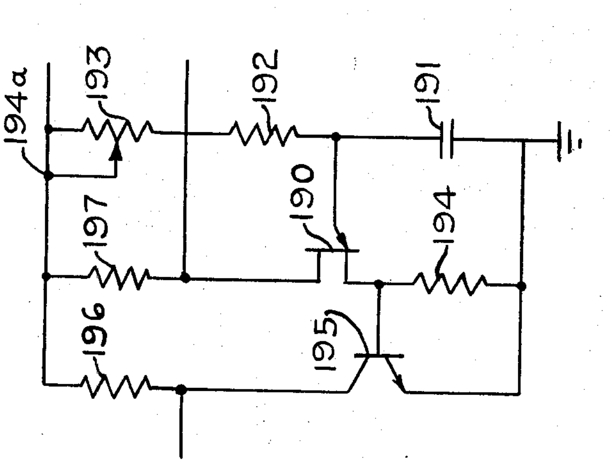
FIG. 6 illustrates pulse rate doubler circuitry.

FIG. 6 illustrates the circuitry of each of the pulse rate doublers 37 and 38. With reference thereto, a unijunction transistor 190 is provided having an emitter connected through a capacitor 191 to ground and through a resistor 192 and an adjustable resistor 193 to a power supply terminal 194. A first base electrode of the transistor 190 is connected through a resistor 194 to ground and to the base of a transistor 195 the emitter of which is connected to ground. The collector of the transistor 195 is connected through a resistor 196 to the power supply terminal and to an output line for feeding a signal to the phase comparator. The second base electrode of the unijunction transistor 190 is connected through a resistor 197 to the power supply terminal and is connected to an input line which in the case of the pulse rate doubler circuit 37 is connected through a capacitor 198 to the terminal of the selector switch 29 and through a resistor 199 to the power supply terminal. In the case of the pulse rate doubler circuit 38, the input line is connected through a diode 200 to a terminal of the selector switch 34.

In operation, the capacitor 191 is charged through current flow through the resistors 192 and 193 until the voltage thereacross reaches a certain level whereupon it discharges through the unijunction transistor 190 and the resistor 194 to develop an output signal amplified by the transistor 195. The resistor 193 is adjusted to obtain a rate of operation approximately equal to twice that of the input pulses, and as the input pulses are applied, the operation of the unijunction transistor 190 is synchronized therewith. It will be appreciated that the rate could be multiplied by a factor greater than two but normally, the doubling of the frequency is sufficient to obviate any discernible flutter.

By way of illustrative example and not by way of limitation, various components of the illustrated circuits may have values as follows:

| | |
|---|---|
| 45 | 0.01 microfarads |
| 49 | 0.01 microfarads |
| 53 | 1000 ohms |
| 54 | 1 megohm |
| 55 | 1000 ohms |
| 57 | 330 ohms |
| 58 | 330 ohms |
| 61 | 220,000 ohms |
| 66 | 0.001 microfarads |
| 67 | 22,000 ohms |
| 68 | 100 picofarads |
| 70, 72 | 4,700 ohms |
| 73 | 0.001 microfarads |
| 74 | 22,000 ohms |
| 75 | 0.001 microfarads |
| 76 | 10,000 ohms |
| 77 | 22,000 ohms |
| 78, 80, 83, 84 | 10,000 ohms |
| 86 | 200 ohms |
| 89 | 560 ohms |
| 93 | 300 ohms |
| 94 | 18 ohms |
| 95 | 12 ohms |
| 97 | 1000 ohms |
| 101 | 560 ohms |
| 103 | 820 ohms |
| 105 | 150 ohms |
| 112 | 25 ohms |
| 131, 133 | 4700 ohms |
| 134 | 1000 ohms |
| 136 | 4700 ohms |
| 137 | 100,000 ohms |
| 139 | 10 microfarads |
| 141 | 4700 ohms |
| 142 | 15,000 ohms |
| 144 | 1000 ohms |
| 146 | 4700 ohms |
| 147 | 100,000 ohms |
| 148 | 47 microfarads |
| 149, 150 | 4700 ohms |
| 152 | 50,000 ohms |
| 155 | 470,000 ohms |
| 156 | 0.01 microfarads |
| 158 | 4700 ohms |
| 172 | 50,000 ohms |
| 173 | 0.01 microfarads |
| 174 | 15,000 ohms |
| 176 | 4700 ohms |
| 177 | 47000 ohms |
| 180 | 22,000 ohms |
| 185, 187, 188, 189 | 3300 ohms |
| 191 | 0.47 microfarads |
| 192 | 47,000 ohms |
| 193 | 50,000 ohms |
| 194 | 220 ohms |
| 196 | 2200 ohms |
| 197 | 220 ohms |
| 198 | 0.05 microfarads |
| 199 | 47,000 ohms |

It will be understood that modifications and variations may be effected without departing from the spirit and scope of the normal concepts of this invention.

I claim as my invention:

1. An apparatus for recording on a developed motion picture film an audio signal previously recorded on a separate magnetic tape during initial exposure of the film in a camera, the tape having a first periodic signal recorded on a control track thereof during initial recording of the audio signal and initial exposure of the film in the camera, comprising first electric drive means for continuously driving the film, second electric drive means for intermittently driving the magnetic tape during selected portions of said continuous film drive, means for energizing said first electric drive means to drive the film at an approximately constant speed, synchronizing means for controllably energizing said second electric drive means to drive the tape in synchronized relation to the drive of the film during selected intervals, means for reproducing the audio signal from the tape, means for recording the reproduced audio signal on the film, said synchronizing means including means for reproducing the first periodic signal from the tape, means associated with said first drive means for supplying a second periodic signal at a rate proportional to the film drive speed, phase comparator means responsive to said reproduced first periodic signal and said second periodic signal for developing a control signal, control means responsive to said control signal for controlling said second drive means to synchronize the drive of the tape with that of the film said film having at least one start mark thereon signifying the starting time of the recording of the audio signal, start mark sensing means for developing a start signal, means responsive to said start signal for initiating energization of said second electric drive means and operation of said synchronizing means, said tape having a high frequency signal recorded on the control track thereof at the end of an audio signal recording sequence, and means for de-energizing said second drive means in response to reproduction of said high frequency signal independently of the operation of said film drive means.

2. The apparatus of claim 1, wherein the start mark is in the form of a transparent portion of the film, and wherein a magnetic stripe is carried on the film for recording the audio signal thereon, the start mark being rendered opaque by the magnetic stripe, and said start mark sensing, further comprising means operative to detect said opaque start mark.

3. The apparatus of claim 1 wherein said start mark sensing means comprises a light source and lens means for impinging light from said source on a portion of said film having said start mark thereon, and photocell means for detecting reflected light.

4. The apparatus of claim 1, wherein said means are responsive to said start signal including amplifier and delay means for delaying the energization of said second drive means and the operation of said synchronizing means with respect to the sensing of said start mark.

5. An apparatus for recording on a developed motion picture film an audio signal previously recorded on a separate magnetic tape during initial exposure of the film in a camera, the tape having a first periodic signal recorded on a control track thereof during initial recording of the audio signal and initial exposure of the film in the camera, comprising first electric drive means for driving the film, second electric drive means for driving the magnetic tape, means for energizing said first electric drive means to drive the film at an approximately constant speed, synchronizing means for controllably energizing said second electric drive means to drive the tape in synchronized relation to the drive of the film, means for reproducing the audio signal from the tape, means for recording the reproduced audio signal on the film, said synchronizing means including means for reproducing the first periodic signal from the tape, means associated with said first drive means for supplying a second periodic signal at a rate proportional to the film drive speed, phase comparator means responsive to said reproduced first periodic signal and said second periodic signal for developing a square wave control signal and control means responsive to said control signal for controlling said second drive means to synchronize the drive of the tape with that of the film, said control means including a period to voltage converter for developing an output voltage proportional to the duration of portions of said control signal for one polarity, governor means responsive to said output voltage to control said drive means, said period to voltage converter including a first capacitor, means for periodically discharging said first capacitor, means for gradually charging said first capacitor to a voltage proportional to the duration of each portion of said square wave signal of said one polarity, a second capacitor, and charge transfer means for periodically connecting said first capacitor to said second capacitor to charge said second capacitor in proportion to the charge of said first capacitor.

6. The apparatus of claim 5, wherein said second capacitor having a value equal to a small fraction of the value of said first capacitor.

7. The apparatus of claim 5, further comprising amplifier means responsive to the voltage across said second capacitor to develop said output voltage of said period to voltage converter.

8. The apparatus of claim 5, further comprising frequency multiplier means for multiplying the frequency of said first period signal, for application to said phase comparator means.

9. The apparatus of claim 8, wherein said frequency multiplier means includes a unijunction transistor oscillator.

10. The apparatus of claim 8, further comprising second frequency multiplier means for multiplying the frequency of said second periodic signal for application to said phase comparator means.

11. The apparatus of claim 10, wherein said second frequency multiplier means comprises a unijunction transistor oscillator.

12. The apparatus of claim 5, further comprising frequency multiplier means for multiplying the frequency of said first periodic signal for application to said phase comparator means.

13. The apparatus of claim 12, further comprising second frequency multiplier means for multiplying the frequency of said second periodic signal for application to said phase comparator means.

* * * * *